United States Patent [19]

Waugh

[11] 4,225,638

[45] Sep. 30, 1980

[54] METHOD AND APPARATUS FOR FLOW COATING WITH SUCK-BACK CONTROL

[75] Inventor: Robert E. Waugh, Columbus, Ohio

[73] Assignee: The D. L. Auld Company, Columbus, Ohio

[21] Appl. No.: 30,201

[22] Filed: Apr. 16, 1979

[51] Int. Cl.² .............................................. B05D 3/00
[52] U.S. Cl. .................................. 427/331; 427/314; 427/346; 118/410; 118/411; 427/389.7
[58] Field of Search ................. 118/410, 411; 427/331, 427/314, 346, 385 A

[56] References Cited

U.S. PATENT DOCUMENTS

| | | | |
|---|---|---|---|
| 2,650,003 | 8/1953 | Coleman | 118/410 |
| 3,892,339 | 7/1975 | Idler | 118/410 |
| 4,092,953 | 6/1978 | Waugh | 118/302 |

Primary Examiner—Ronald H. Smith
Assistant Examiner—Janyce A. Bell
Attorney, Agent, or Firm—Biebel, French & Nauman

[57] ABSTRACT

A method and apparatus for coating articles with a layer of plastic in which drippage of excess coating material onto the freshly coated articles is eliminated. A plurality of liquid plastic applicator nozzles positioned above a coating station supply coating material to an article. When the coating operation is completed, a suckback cycle is initiated creating a negative pressure inside the nozzles and drawing back into the nozzles any excess material. Where different amounts of coating material may be supplied to different zones on the article, each individual zone of applicator nozzles is independently controlled, both in the flow and suck-back cycles of operation.

12 Claims, 13 Drawing Figures

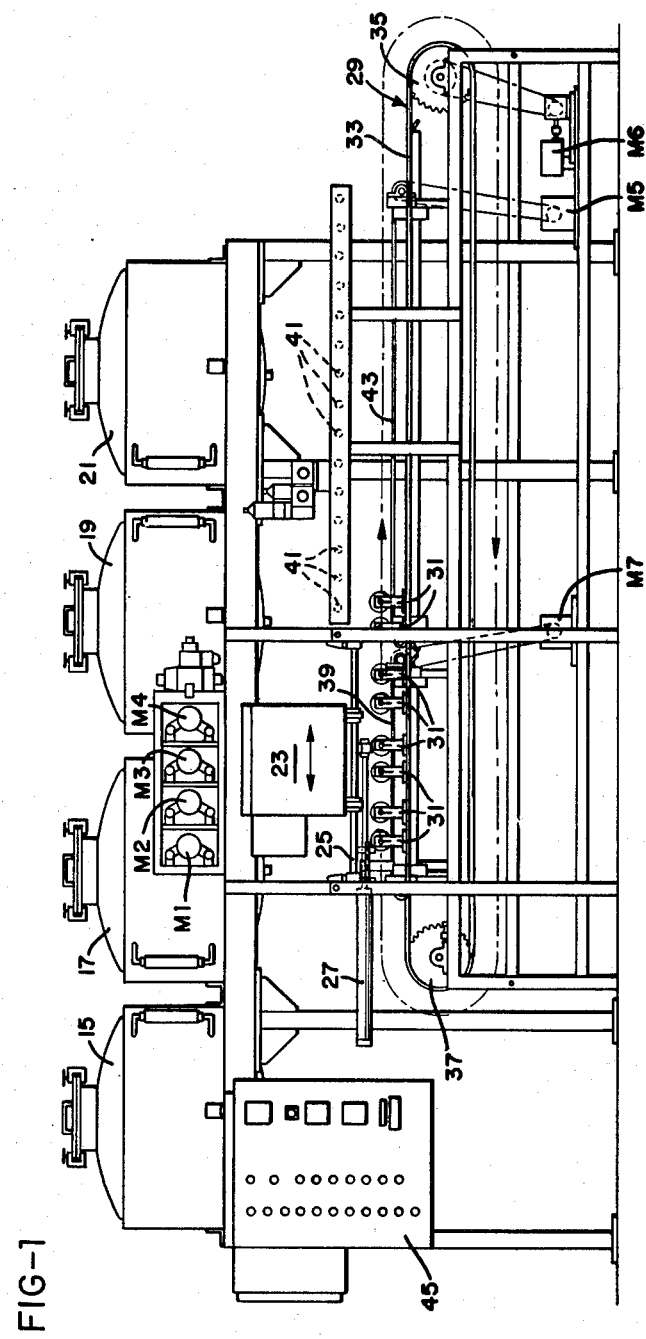

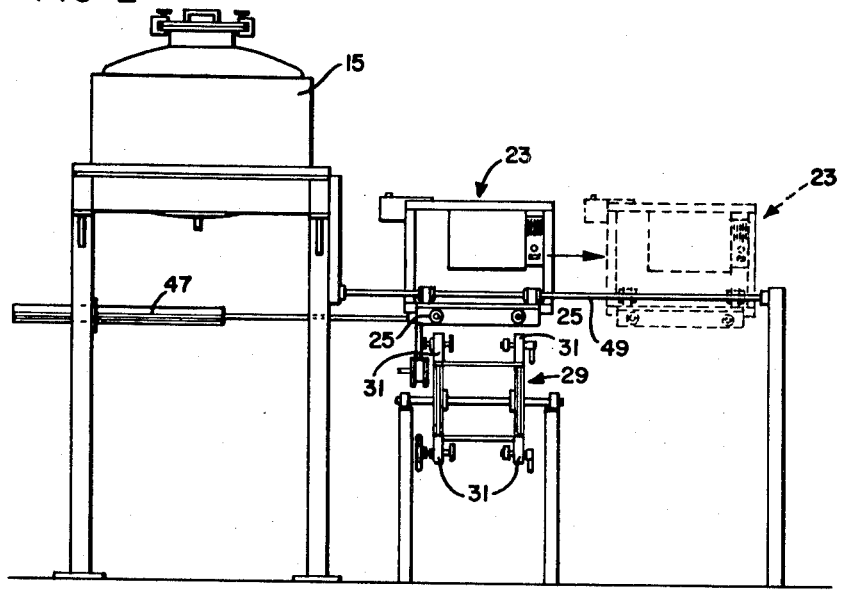
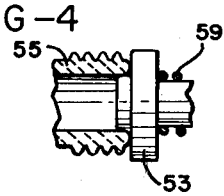
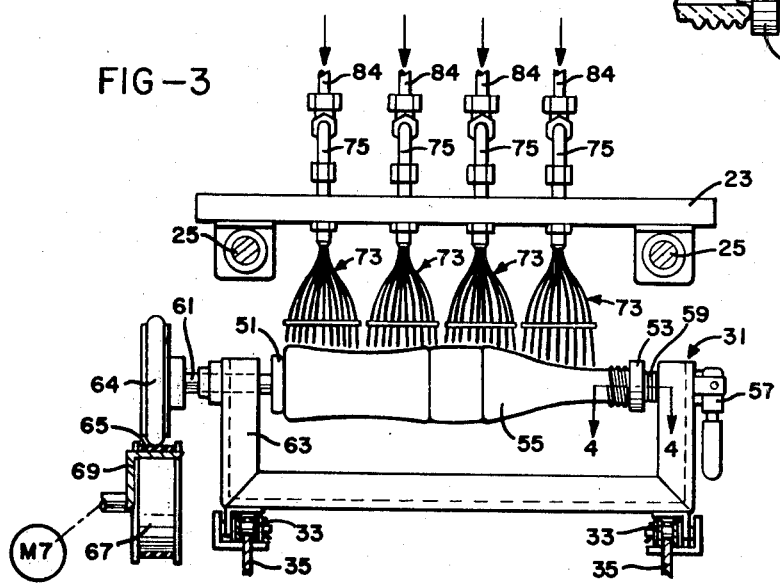

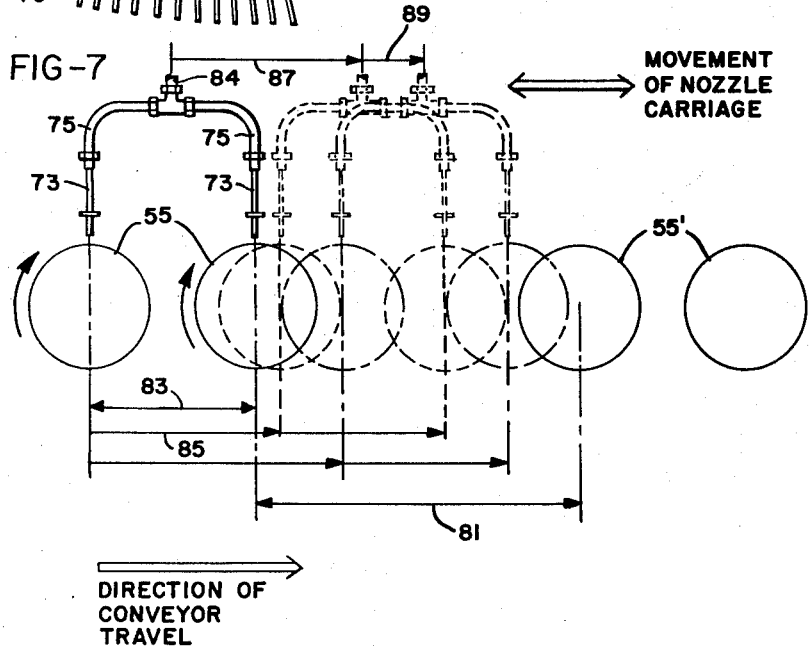

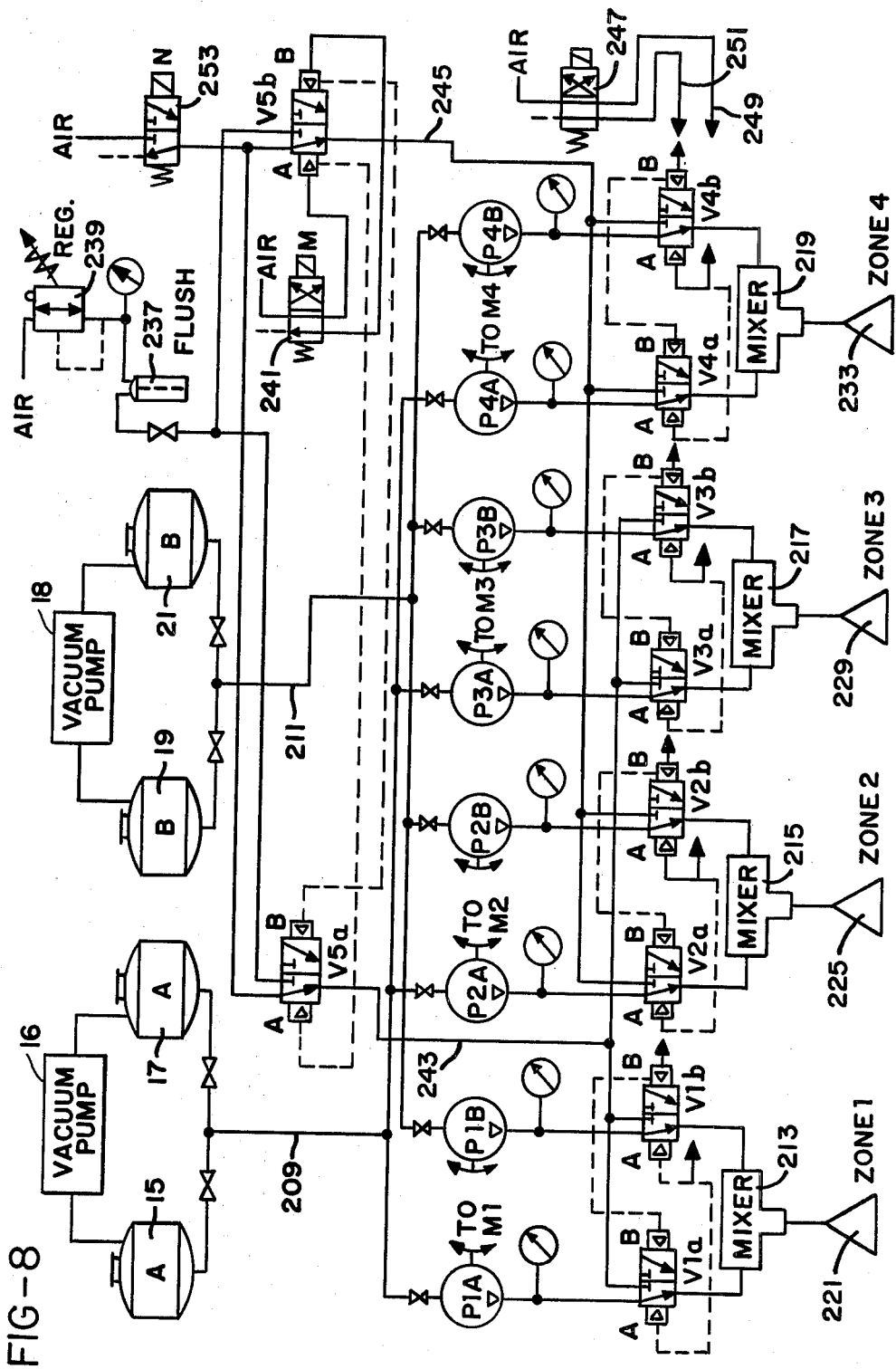

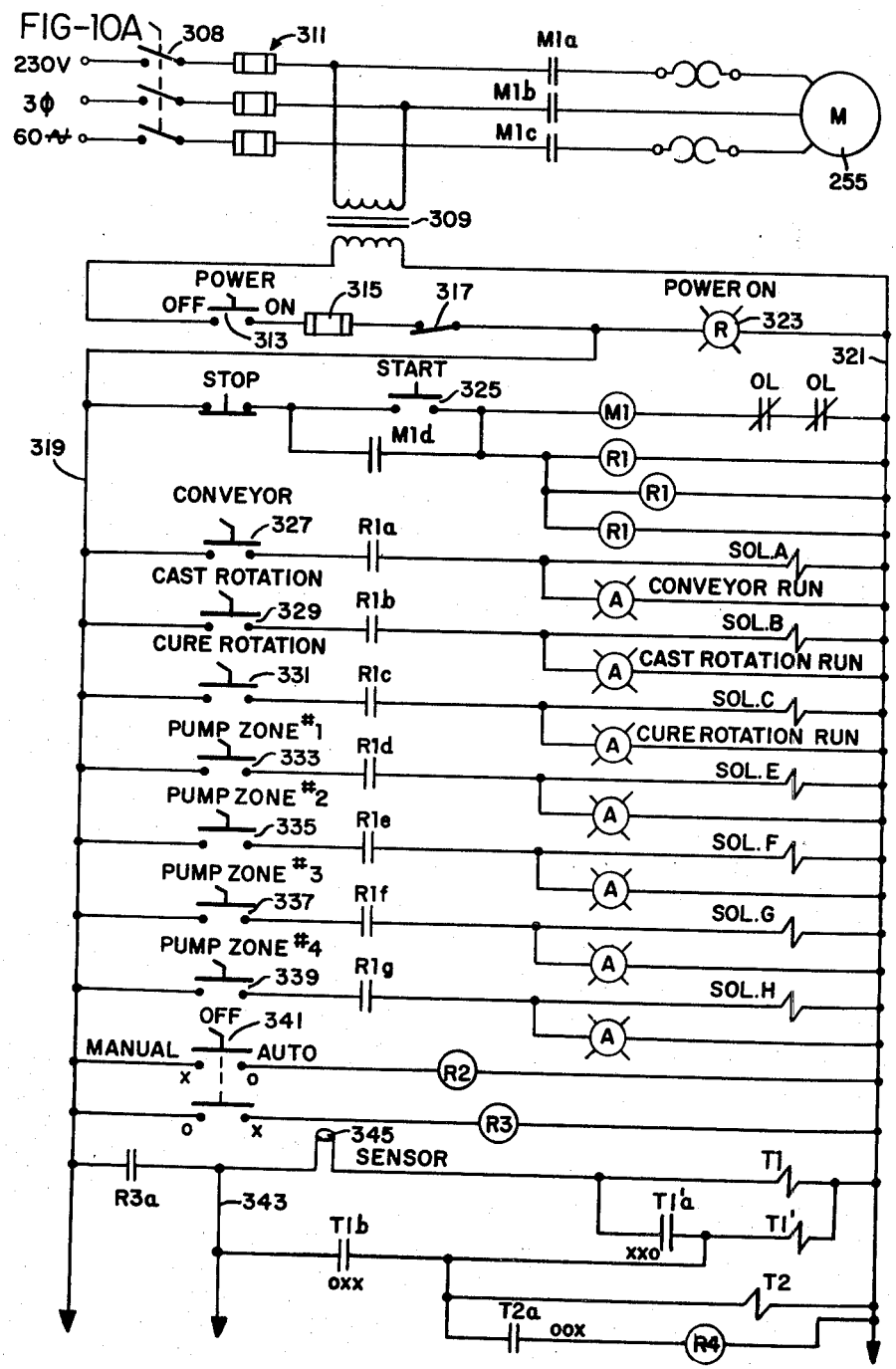

METHOD AND APPARATUS FOR FLOW COATING WITH SUCK-BACK CONTROL

BACKGROUND OF THE INVENTION

The present invention relates to flow coating articles with a viscous, plastic coating using a plurality of nozzles, and more particularly, to a device and method for eliminating the drippage of excess material from such nozzles.

Flow coating of various articles of manufacture with polymeric resin or other coating material has become more widespread during the past few years. For example, flow coating processes have been used to coat such diverse articles as glass containers, as taught by Waugh, U.S. Pat. No. 4,092,953; plywood surfaces, as taught by Fraatz, U.S. Pat. No. 3,431,889; substrates such as steel, wood, hardboard, aluminum and the like, as taught by Hanson, U.S. Pat. No. 3,725,112; and foil substrates in the production of decorative emblems as disclosed in copending application Ser. No. 903,829, filed May 8, 1978.

For many, if not all, of the above coating procedures, it is necessary that the coating thickness be closely controlled and that the coating be laid down with no surface discontinuities. But, because the plastic coating material is in a liquid state during the coating procedure, the residual material in the applicator nozzles has a tendency to drip from the tips of these nozzles even after flow has been shut off. This not only wastes plastic material but also causes surface discontinuities on the coated article.

Accordingly, there is a need in the art for a process and apparatus whereby flow from the applicator nozzles of a plastic flow coating device may be terminated accurately and without drippage.

SUMMARY OF THE INVENTION

The present invention meets this need by providing a method and apparatus for flow coating containers and other articles of wood, glass, metal or other material with a layer of plastic while eliminating drippage from the applicator nozzles of the coating device. In one embodiment, decorative foil substrates of the type disclosed in copending application Ser. No. 903,829, filed May 8, 1978, may be coated with a layer of plastic using the unique nozzle arrangement and method of the present invention. However, in the preferred embodiment of the invention, glass containers, e.g., bottles, jars, and tubes, are coated with a layer of plastic by rotating the containers about a horizontal axis while moving them past a coating station having a plurality of liquid applicator nozzle means as taught by Waugh, U.S. Pat. No. 4,092,953. Each nozzle means applies an uncured liquid plastic such as polyurethane to an associated area of each container as they are moved past the coating station in a direction perpendicular to the horizontal axis of the containers.

The coating apparatus is also provided with means to meter predetermined amounts of uncured liquid plastic (which may vary in composition, color, etc.) to each respective nozzle means. As the coating operation is completed, means are provided which impart a back pressure on the applicator nozzle means which prevents any drippage of coating material from the nozzle means by sucking back into the nozzle means any pendulous masses of coating material adhering to the tips of such means. The nozzle means are then automatically returned to the starting position at the coating cycle in preparation for the next container.

A curing zone is provided for the coated containers to pass through. Means are also provided for rotating the coated containers slowly as they move through the zone. Finally, the system is provided with a means for flushing coating material out of the lines and nozzles using a solvent which is pumped therethrough prior to shutdown of the system.

In operation, containers are initially cleaned by a conventional washing and drying process, and then a silane primer is applied from a solvent containing mixture. The containers are again dried to remove the solvent and may be optionally preheated to 110°–130° F. to aid in the flow coating with the uncured polyurethane liquid plastic. The polyurethane components are mixed together and then metered in predetermined amounts to each applicator nozzle means (for examples, four series of applicator tubes varying from 12 to 36 tubes each) where it is applied as the containers are rotated at approximately 40–60 RPM beneath the nozzles. The containers may make either one or two revolutions during the coating procedure, each individual cycle lasting 1.0–1.5 seconds. At the end of each cycle, the hydraulic motors driving the pumps metering the coating liquid to the applicator nozzles are reversed causing a slight back pressure in the tubes and nozzles and drawing or sucking back any excess coating liquid still adhering to the nozzle tips. This reversing cycle lasts only approximately 0.25 seconds and insures that no liquid coating material drips from the applicator nozzles onto the freshly coated containers.

The coated containers are then moved to a curing zone, such as an infrared oven, for a period of time sufficient to cure the polyurethane resin. The containers may be rotated at approximately 20–30 RPM during curing to assure a uniform coating. The containers are then cooled and are immediately ready for use.

By using the process and apparatus of this invention it is possible to obtain a uniform coating of a tough plastic material, such as polyurethane, without the need for solvent sprays, dip baths, or external coating smoothing means such as gas jets. The process is flexible in that the amounts and types of coatings are controlled, and the system has the capability to vary coating thicknesses to provide extra protection or strength where needed. The process and apparatus are also easily adapted to uniformly coat sheets of wood, metal, and glass, or other articles.

Accordingly, it is an object of the present invention to provide separate coating applicator means to flow coat uniformly articles of glass, wood, metal, or the like with accurate flow cut off and no drippage of excess coating material. This and other objects and advantages of the invention will become apparent from the following description, the accompanying drawings, and the appended claims.

BRIEF DESCRIPTION OF THE DRAWINGS

FIG. 1 is an overall view of an embodiment of the present invention;

FIG. 2 is a side view of the embodiment of FIG. 1, as seen looking left to right in FIG. 1;

FIG. 3 is a view illustrating the coating nozzle arrangement of the present invention;

FIG. 4 is an enlarged partial sectional view, taken generally along the line 4—4 in FIG. 3;

FIG. 5 is an enlarged view showing a coated bottle with a portion broken away and in section;

FIG. 6 is an enlarged view showing a single nozzle;

FIG. 7 is a diagrammatic view illustrating the motion of the nozzle carriage during the coating process;

FIG. 8 is a view showing the systemic system for supplying uncured liquid plastic to the nozzles;

FIGS. 10A, 10B, and 10C, when placed together with FIG. 10A above FIG. 10B above FIG. 10C, illustrate the electrical control circuit of the present invention.

DETAILED DESCRIPTION OF THE PREFERRED EMBODIMENTS

Figure 9A:
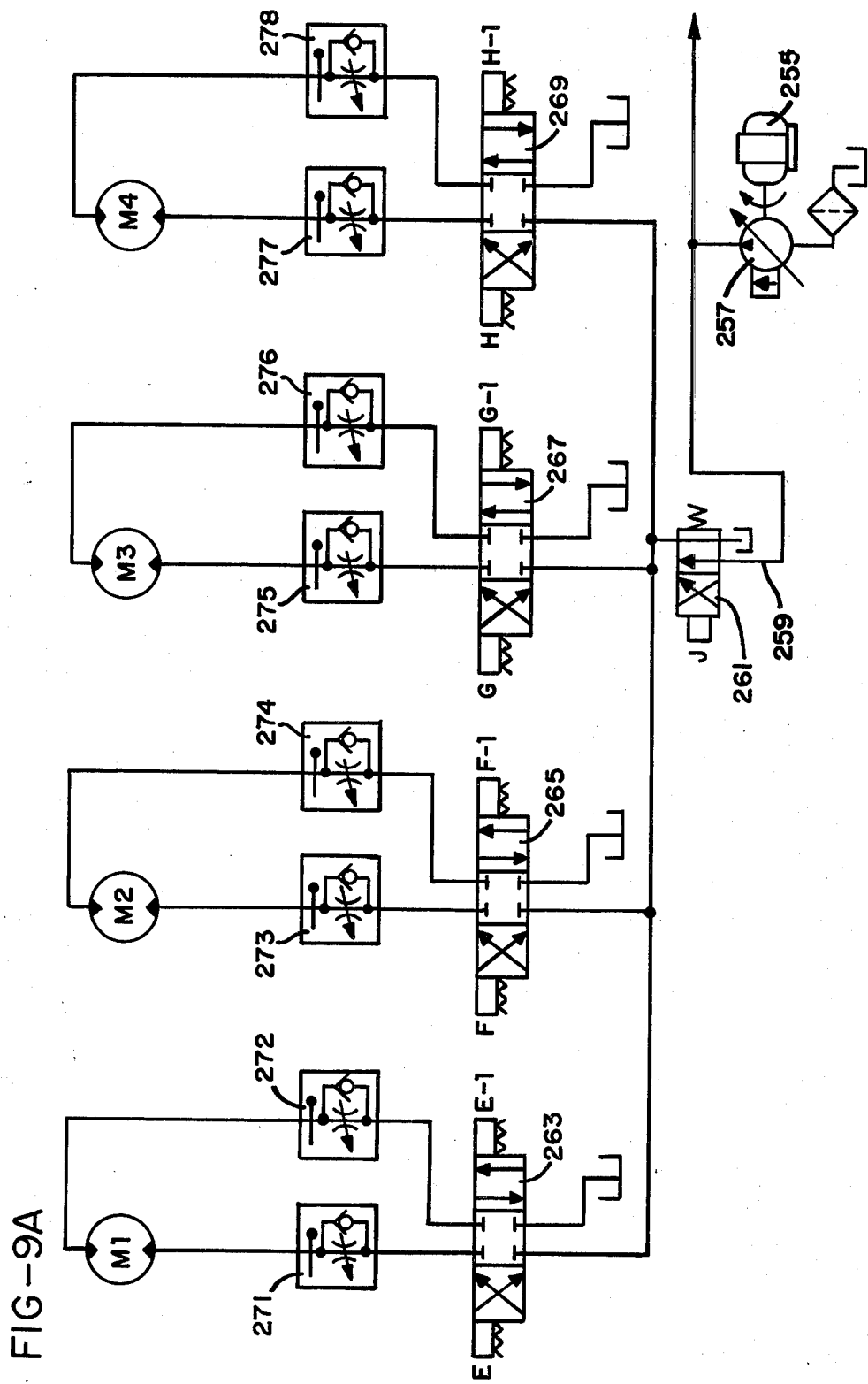
FIGS. 9A and 9B when placed side by side form a schematic diagram illustrating the hydraulic system of the present invention.

While the nozzle arrangement, with its suckback control, may be used in a number of processes for flow coating fluent plastic onto a substrate, two in particular are preferred. One is a process of the type disclosed in my copending application Ser. No. 903,829, filed May 8, 1978. In that application, which is specifically incorporated herein by reference, there is disclosed a method for making decorative emblems by depositing fluent plastic on a decorative substrate.

The substrate upon which the fluent plastic is coated may be a plastic or metal foil, preferably an aluminum foil 0.003 to 0.020 inch thick. The foil substrate is decorated with an appropriate design or series of designs. For example, if a foil sheet or a substantial part of it is to be used as a panel with a minimum amount of trimming after being coated, a single design might be used. More commonly, a series of designs in the form of individual emblems or plaque shapes will be applied to the foil sheet. With a metal foil, the series of designs is preferably applied by silk screen or lighographic printing then the design is enhanced by embossing select areas; although, other means for forming the decorative designs may also be used.

Likewise, it is desirable to prime the top surface of the substrate prior to printing. Any suitable primer may be used such as a silane primer. The decorated-primed substrate is then placed upon a vacuum mat which is situated upon a horizontal vacuum table such as that shown in U.S. Pat. No. 4,034,708, and assigned to the assignee of this invention. Vacuum is drawn against the bottom surface of the foil through the mat to hold the substrate flat and horizontal.

It is important that the substrate be held flat and horizontal during flow coating because of the fact that the flow characteristics of the fluent plastic and the liquid wettability of the substrate are used to control the spread of the plastic so that it is contiguous with predetermined areas of the foil as well as being uniformly thick. Another feature which may be used in controlling this is the existence of sharply defined peripheral sides for the substrate or for specified areas of the substrate.

Thus, it is possible to limit the coated areas of a single foil sheet by forming slits, embossed ridges, or other sharp edges in the sheet. When a predetermined amount of fluent plastic is flow coated onto that area, then, it will spread only to the sharply defined peripheral side. In this manner, it is possible to avoid waste by coating only the path directly over the designs from which the emblems or plaques are to be formed, and not wastefully on peripheral areas which are to be discarded.

In the invention of Ser. No. 903,829, the flow coating is a path-wide disposition. That is, a multiple orifice nozzle (or nozzles) is passed over the decorated-primed surface of the foil at a steady speed as the substrate is held stationary. The number of orifices used may vary depending on the width of the path to be laid down. As an example, a 2.1 inch wide nozzle having 22 orifices of a 0.022 inch I.D. and with a 0.10 inch spacing between the orifices, can be used to lay down a path of 2.4 to 2.5 inches in width.

As can be seen from this example, if such a nozzle is to be used to coat a sheet of greater than 2.5 inches width, then either several nozzles tracking across the sheet in parallel paths must be used or the single nozzle must be programmed to track back and forth across the sheet until the surface is covered with a uniform thickness of the fluent plastic.

The thickness sought is between approximately 0.020 to 0.030 inch. The plastic is preferably a fluent polyurethane of two component parts (polyol and isocyanate) which are mixed immediately prior to coating and cure upon heating. A polyurethane of this type is disclosed in my U.S. Pat. No. 4,100,010. In formulating the particular plastic composition from among those disclosed in the copending application, it is important to use a catalyst which results in a somewhat slow curing time in order to allow the flow coated liquid plastic to flow to its full extent, i.e., to the sharply defined peripheral sides, before curing is accomplished. Otherwise, it may not be possible to obtain a uniform thickness, smooth coating.

Likewise, the polyurethane may be compounded from among the components listed in the copending application as is known to give a more flexible cured plastic. As long as the bond to the substrate remains strong, it is desirable in this invention to have a somewhat flexible plastic coat so that the emblem, plaque, or panel may be conformed. For example, some decorative automobile panels are applied to a curved surface. With the present invention, it is possible to conform the cured plastic coated panel to that surface.

For most of the types of plastic contemplated, curing will be by irradiation with infrared or ultraviolet light. The polyurethane compounds mentioned above are heat curable and, thus, infrared lamps are used; although, obviously other heat sources may also be used. Still, it is desirable to get a through cure, i.e., heat from both the top and bottom of the coated foil. The preferred vacuum table arrangement of U.S. Pat. No. 4,034,708 makes this possible because of a capability of heating or cooling it. However, it has been found desirable to use the infrared lamps themselves as the heat source for both top and bottom heating. This may be done by using an I. R. absorptive mat as the vacuum mat. The mat will, then, pick up heat from the infrared radiation and conduct it back from the bottom through the coated foil.

After curing, the coated substrate is cooled and removed from the vacuum table. It may at this stage be further processed by cutting, trimming and forming. When individual emblem or plaque shapes are contained on the single sheet, they are stamped out by a cutting die around the particular emblem or plaque shape. It has been found that by die cutting from the bottom surface of the coated foil, it is possible to impart a slightly convex configuration when viewed from the top surface. The convex shape helps give the appearance of a lens effect to the emblem; although, one does not actually exist.

Even more preferred than production of decorative emblems as just described, is coating glass containers in the manner described in my U.S. Pat. No. 4,092,953. Accordingly, the Figures and the remaining description relate to that embodiment where FIG. 1 illustrates the preferred container coating device of the present invention.

The bottles are intended to be coated with an uncured polyurethane liquid plastic, which is quickly cured under either ultraviolet or infrared light. Again, the preferred plastic is a mixture of "A" and "B" components of the type disclosed in Waugh, U.S. Pat. No. 4,100,010. Basically, that mixture is one of a polyether polyol component ("A"), which may be a difunctional, trifunctional and/or tetrafunctional polypropylene glycol containing a suitable catalyst, and a diisocyanate component ("B") such as an aliphatic diisocyanate. As stated in U.S. Pat. No. 4,100,010, which is specifically incorporated herein by reference, an example of the diisocyanate is Hylene W from E. I, duPont de Nemours & Co., and the polyether polyol may be one or more of the Pluracol materials (P-410 or TP-440) from BASF Wyandotte. It may also be a polyether-polyester polyol combination. The ratio of components A:B is preferably 50-60:40-50. A polyester polyol or polylactone polyol could be used in place of the polyether polyol.

The mixture of "A" and "B" components of this type cures, through catalytic action, under heat such as produced by infrared radiation. Accordingly, this type of arrangement will be disclosed as the preferred embodiment; although, single component, photocurable, polyurethanes of known types could also be used.

In either event it is desirable to prime the glass bottle with a silane before coating. As an example, a mixture of approximately 2% castor oil (Surfactol from The Baker Castor Oil Co.) and up to approximately 2% silane (Dow 6020, 6040 or 6075 from Dow Corning Corp., which are respectively, 3-(2-aminoethylamine) propyltrimethoxysilane, glycidoxypropyltrimethoxysilane, and vinyltriacetooxysilane) in a solvent (70% isopropyl alcohol and 30% acetone) may be used. Other known silane primers may also be used. The primers may be pre-applied by spraying or dipping, followed by drying to remove the solvent. Alternatively, it may be applied as an initial step in a continuous bottle coating process of the type described hereinafter.

In the preferred form of that process, tanks 15 and 17 are provided to store the "A" material while tanks 19 and 21 provide storage for the "B" material. Only one of tanks 15 and 17 and one of tanks 19 and 21 will be used as a supply at any one time, thus permitting the other of each pair to be refilled. A plurality of hydraulic motors M1, M2, M3, and M4 are provided for driving a plurality of associated pairs of pumps which pump the "A" and "B" materials to a plurality of nozzle means on nozzle carriage 23. Nozzle carriage 23 is slidably mounted on rods 25 for motion as indicated, under control of hydraulic cylinder 27.

Conveyor mechanism 29 is driven by hydraulic motor M6 and has mounted thereon a plurality of pairs of bottle chucks 31. For the sake of clarity, only a few chucks are shown in FIG. 1; however, it should be understood that the chucks in the device are mounted in pairs all along the conveyor mechanism 29. The conveyor may advantageously comprise a pair of chains 33 driven by sprockets 35 and passing around idler sprockets 37. A hydraulic motor M7 drives rotation mechanism 39 which rotates the bottles as they pass beneath the nozzle carriage 23 through an area termed the coating station. As mentioned, the bottles may be primed by being pre-coated with silane prior to coating. The primed bottles are placed in the chucks at the left end of the conveyor. The bottles are rotated and coated at the coating station and then pass beneath a plurality of infrared lamps 41 which accelerate the curing of the liquid plastic. A cure rotation arrangement 43 is driven by motor M5 and is provided to rotate the bottles continuously as they pass beneath the lamps 41. The coated bottles are then removed from the chucks at the right end of the conveyor. Cabinet 45 houses the electrical control circuitry of the present invention.

As seen in FIG. 2, the nozzle carriage 23 may be shifted laterally by hydraulic cylinder 47 such that the nozzle carriage will no longer be positioned above the conveyor 29. The carriage 23 is slidably shifted on rods 49 to the position shown by the dashed lines in FIG. 2 when it is desired to clean the system by flushing it out with solvent. A container may be placed beneath the nozzle carriage to catch the solvent discharged during the flushing operation.

In FIGS. 3 and 4, the bottle chuck mechanism for holding and rotating a bottle during the coating and curing process is illustrated in greater detail. Each bottle to be coated is placed on a chuck 31 which includes bottle gripping pads 51 and 53. As seen in FIG. 4, pad 53 is shaped to extend slightly into the mouth of the bottle 55 and thereby to engage the bottle securely. Pad 51 is shaped to conform to the bottom contour of the bottle 55. Lever mechanism 57 may be shifted to pull pad 53 outwardly from the bottle against the force of compression spring 59, thus permitting the removal of the bottle at the completion of the coating process and the insertion of an uncoated bottle.

Pad 51 is connected to shaft 61 which is journaled in member 63 and is free to rotate. Rotation wheel 64 is driven by belt 65 which forms a portion of the rotation mechanism 39 (FIG. 1). Belt 65 extends the length of the coating station and is driven by hydraulic motor M7 via driving pulley 67 at a speed which exceeds the speed of conveyor 29. Belt 65 therefore engages wheel 64 and, backed by metal strip 69, causes bottle 55 to rotate at approximately 40 to 60 RPM during the coating process. A rotation belt is likewise included in the rotation mechanism 43 for rotating the bottle during curing of the plastic, preferably at a speed of approximately 20-30 RPM. Rotation at the coating station and during curing results in a uniform distribution of liquid plastic and prevents streaks or other imperfections in the coating layer.

A pre-heating station (not shown) may be placed before the coating station for the purpose of pre-heating the bottles to around 110°-130° F. in order to aid the flow of the coating onto the bottle. This is not required, however.

As seen in FIG. 5, a typical soft drink bottle which is to be coated with a layer 71 of plastic may vary somewhat in circumference along its length and may have ridges or other points of sharp surface curvature. It will be appreciated that the volume of liquid plastic which would be desirable to apply may vary along the length of the bottle. The bottle of FIG. 5 has been divided into four zones and it is clear that if a coating of uniform thickness were desired, a greater volume of plastic would be required for zone two, for example, than for zone four. Additionally, it may be desired to apply a thicker and/or tougher coating of plastic to the surface areas of the bottles which receive the greatest stress and wear. Typically, these areas are the areas with the largest circumference and the rim around the bottom of the bottle.

In order to provide the desired thicknesses of plastic in each zone, a plurality of liquid applicator nozzle means 73, as seen in FIG. 3, are provided. The nozzle means for each zone has its own supply of uncured liquid plastic 75 and applies different predetermined quantities of uncured liquid plastic to its associated zone during the coating process. Accordingly, the different zones of the bottle may be coated with plastic of differing thickness, composition, color, etc.

FIG. 6 illustrates one of the nozzle means 73 in greater detail. A fitting 77 connects each of a plurality of fluid carrying tubes 79 to its associated liquid plastic supply. The number of tubes 79 and the spacing between the tubes in an individual nozzle means will vary in dependence on the bottle contour. It has been found, however, that between 12 and 36 tubes, spaced apart approximately $\frac{1}{8}$ to 1/10 inch, may be used for each nozzle means in the present embodiment. The tubes preferably have 0.022 inch I.D. and 0.039 inch O.D. Spacer bar 81 holds the tubes 79 spaced apart at desired distances. For application of a uniform thickness coating across each of the four zones of a $\frac{1}{2}$ or 1 liter bottle of the type shown in FIG. 3, 18 tubes are used in each of the first three nozzle means and 14 are used in the fourth. Such a nozzle means arrangement is preferably used with a flow rate of around 145 g/min. to deposit 3-15 grams of liquid plastic per bottle to a thickness of 100-250 microns.

FIG. 7 is a diagrammatic representation of the coating process looking at the device from the same side as in FIG. 1. The initial position of a pair of bottles 55 at the coating station is shown by the solid circles. A pair of bottles 55' which have just been coated are spaced along the conveyor by a distance 81. The pair of bottles are spaced apart from each other by a distance 83. The pair of bottles 55 will be coated simultaneously by two sets of nozzle means 73. One of a plurality of supply tubes 84 provides the uncured liquid plastic to nozzle means which coat corresponding zones on the two bottles. The bottles 55 are coated as they rotate and, at the same time, move through the coating station on the conveyor by a distance 85. The nozzle means 73 are also moved along the conveyor a corresponding distance 87 such that they remain above the respective bottles 55 during coating.

After the bottles have been completed at least one full rotation and the coating process has been completed, the flow of coating material is immediately terminated by the initiation of a suck-back cycle in which the hydraulic motors driving the metering pumps are reversed and create a slight suction to pull or suck back any coating material remaining on the nozzle applicator tips. While this suck-back cycle is occurring, the nozzles continue to move forward with the rotating bottles a distance 89. The nozzle means 73 are then returned to their initial position to await the movement of the succeeding pair of bottles into position at the coating station. Alternatively the continuous movement of the bottles may be temporarily halted during the coating operation, in which case movement of the nozzle means is not necessary.

Referring now to FIGS. 8, 9A, 9B, and 10A-C, the systemic, hydraulic, and electrical systems for the device of the present invention are shown. The systemic system illustrated in FIG. 8 includes all of the conduits, pumps, and valves through which the liquid plastic material flows. It is to be distinguished from the hydraulic system illustrated in FIGS. 9A and 9B which includes all of the conduits, valves, pumps, and motors through which hydraulic fluid flows and the electrical system illustrated in FIGS. 10A-10C. As seen in FIG. 8, the "A" material is stored in tanks 15 and 17, and the "B" material is stored in tanks 19 and 21. All four tanks may be partially evacuated by vacuum pumps 16 and 18. As mentioned previously, dual tanks are used for storage of each material so that one tank may be refilled while the material is supplied to the coating device by the other tank.

"A" material is supplied through line 209 to pumps P1A, P2A, P3A, and P4A. Similarly, "B" material is supplied through line 211 to pumps P1B, P2B, P3B, and P4B. Hydraulic motor M1 is mechanically coupled to pumps P1A and P1B; hydraulic motor M2 is mechanically coupled to pumps P2A and P2B; hydraulic motor M3 is mechanically coupled to pumps P3A and P3B; and, hydraulic motor M4 is mechanically coupled to pumps P4A and P4B. The mechanical coupling between each of motors M1-M4 and their associated pumps is such that each set of pumps will pump the requied proportion of "A" and "B" material as the motor rotates.

Valves V1a, V1b, V2a, V2b, V3a, V3b, V4a, and V4b are coupled to the pump outputs and, when in the positions shown in FIG. 8, supply the "A" and "B" material to mixers 213, 215, 217, and 219. These mixers may simply be tubes which contain a plurality of static vanes or baffles which will cause the fluid pumped therethrough to be mixed thoroughly. Nozzle means 221, 225, 229, and 233 simultaneously supply the uncured liquid plastic to the four zones on the bottle. During the normal coating operation, all of the systemic valves will remain as shown in FIG. 8. Control of the application of uncured liquid plastic will be accomplished by controlling the operation of hydraulic motors M1-M4.

FIGS. 1-7 illustrate a single station bottle coating system that will coat two bottles at a time. If desired, a dual station machine can be used to coat one bottle per station or two bottles per station as required. In the operation of a dual station bottle coating system, a second identical set of motors, pumps, valves, and mixers are required to run the second bottle coating station. For the sake of simplicity, only the first station operation is illustrated in FIG. 8.

At the end of a period of operation, it may be desired to shut down the machine. As discussed above, it is then necessary to clean the portions of the systemic system having the mixed "A" and "B" material before this material cures. For this purpose, a tank 237 is provided containing a solvent to dissolve the mixed "A" and "B" material before it self-cures. Pressurized air is provided through valve 239 such that the flush tank is held pressurized. When valves V5a and V5b are actuated into their B positions by solenoid actuated valve 241, the solvent fluid will flow through lines 243 and 245.

Solenoid actuated valve 247 supplies air through line 249 to the pilot on the A side of valves V1a, V1b, V2a, V2b, V3a, V3b, V4a, and V4b. Likewise, the pilot for the B side of these valves is connected to line 251. It is clear, therefore, that when valve 247 is actuated such that the air is supplied to the B sides of valves V1–V4 on line 251, the solvent in lines 243 and 245 will flow through valves V1–V4, mixers 213–219, and nozzle means 221–233. After a sufficient quantity of solvent has flowed through the lines, valves V5a and V5b are returned to their A positions. Valve 253 is then actuated and pressurized air is supplied to lines 243 and 245 to flush these lines and their associated valves and nozzles of all solvent and uncured plastic. The application of solvent and air to these lines may be repeated to insure adequate cleaning.

Figure 9B:
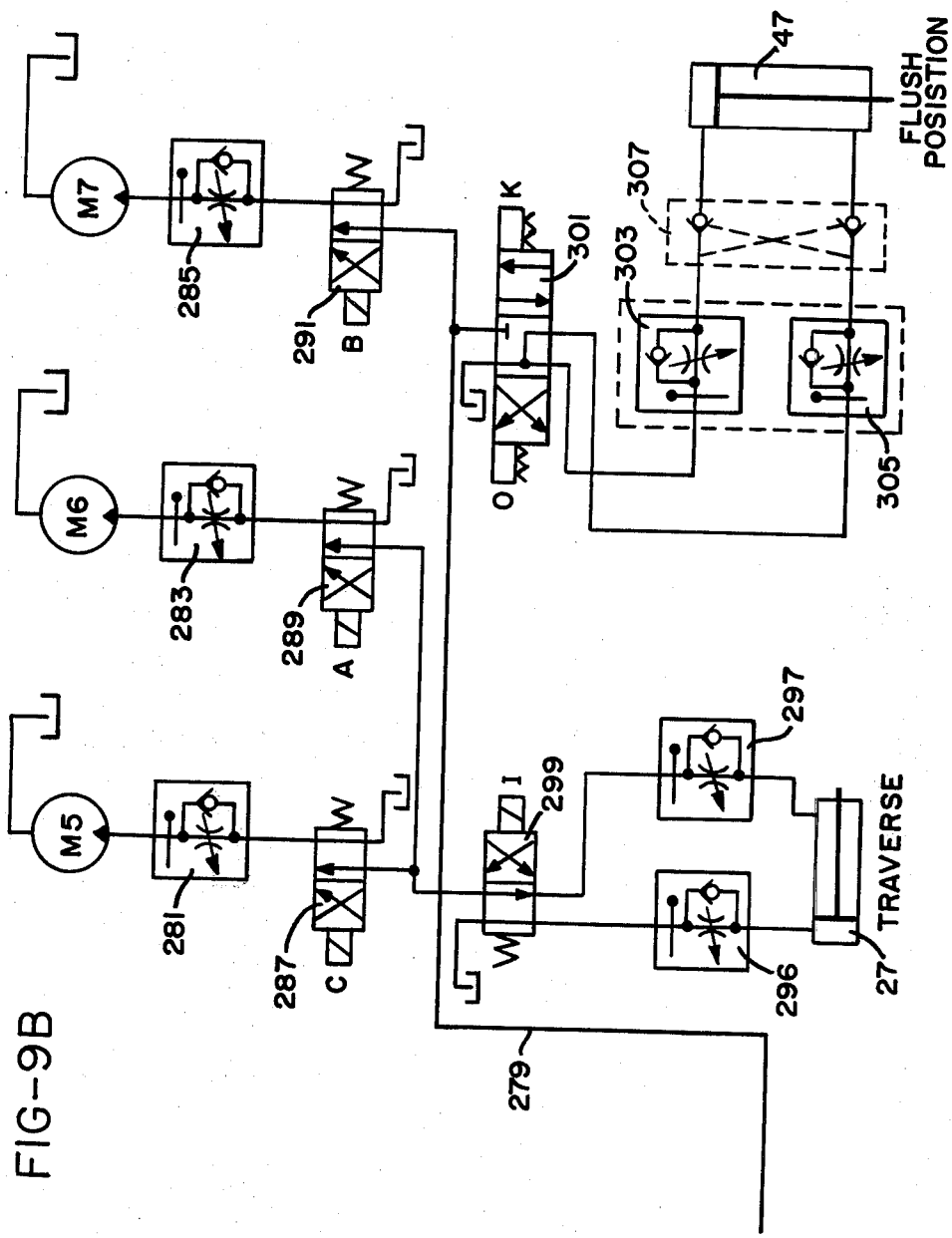

Reference is now made to FIGS. 9A and 9B, in which the hydraulic portion of the present invention is illustrated schematically. Electric motor 255 drives hydraulic pump 257 and provides the sole source of power for the hydraulic system. Motor 255 may typically be a 10 horsepower, 1800 RPM, 3 phase, AC motor. Hydraulic fluid is supplied on line 259 to valve 261. Valve 261 is, in turn, connected to valves 263, 265, 267, and 269.

During the casting operation, valves 261–269 are actuated and hydraulic fluid is provided to hydraulic motors M1–M4 through adjustable pressure and temperature compensated valves 272, 274, 276, and 278. As discussed above in regard to FIG. 8, motors M1 through M4 provide driving power to the systemic pumps which pump uncured liquid coating material to the applicator nozzles. When the casting operation has been completed, valves 263–269 are actuated to a second flow arrangement which directs hydraulic fluid through adjustable pressure and temperature compensated valves 271, 273, 275, and 277. This opposite direction of flow of hydraulic fluid reverses motors M1 through M4 and the associated systemic pumps to cause a slight negative pressure in the coating fluid lines and initiate the suck-back cycle. Upon completion of the suck-back cycle, valves 263–269 are returned to a neutral or no-flow condition.

Hydrualic fluid is also supplied to line 279 by pump 257 and motors M5, M6, and M7 are provided with hydraulic fluid through valves 281, 283, and 285 via valves 287, 289, and 291. Motor M5 is connected to drive the cure rotation belt mechanism 43. Motor M6 drives the conveyor 29, and motor M7 drives the cast rotation mechanism 39. Additionally, hydraulic cylinders 27 and 47 are operated to move the nozzle carriage. Cylinder 27 is the traverse cylinder mechanism for moving the carriage along the conveyor during the coating operation. Cylinder 27 is supplied with fluid through valves 296 or 297 via valve 299. Similarly, cylinder 47 moves the carriage laterally such that flushing may be carried out to one side of the conveyor. Valve 301 applies fluid to either valve 303 or valve 305. Pressure piloted check valves 307 insure that the cylinder 47 maintains the desired position when set.

Figure 10B:
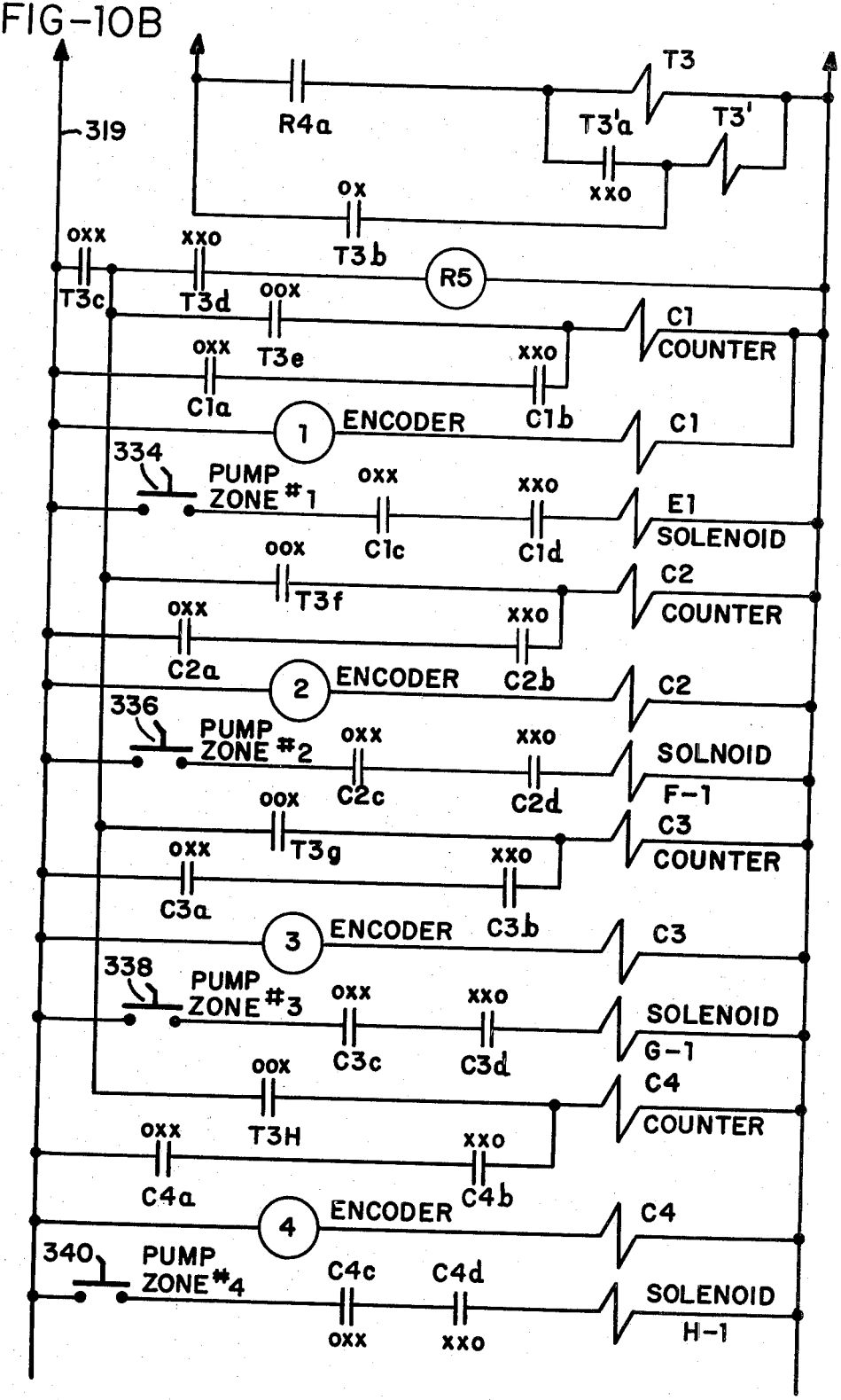
Figure 10C:
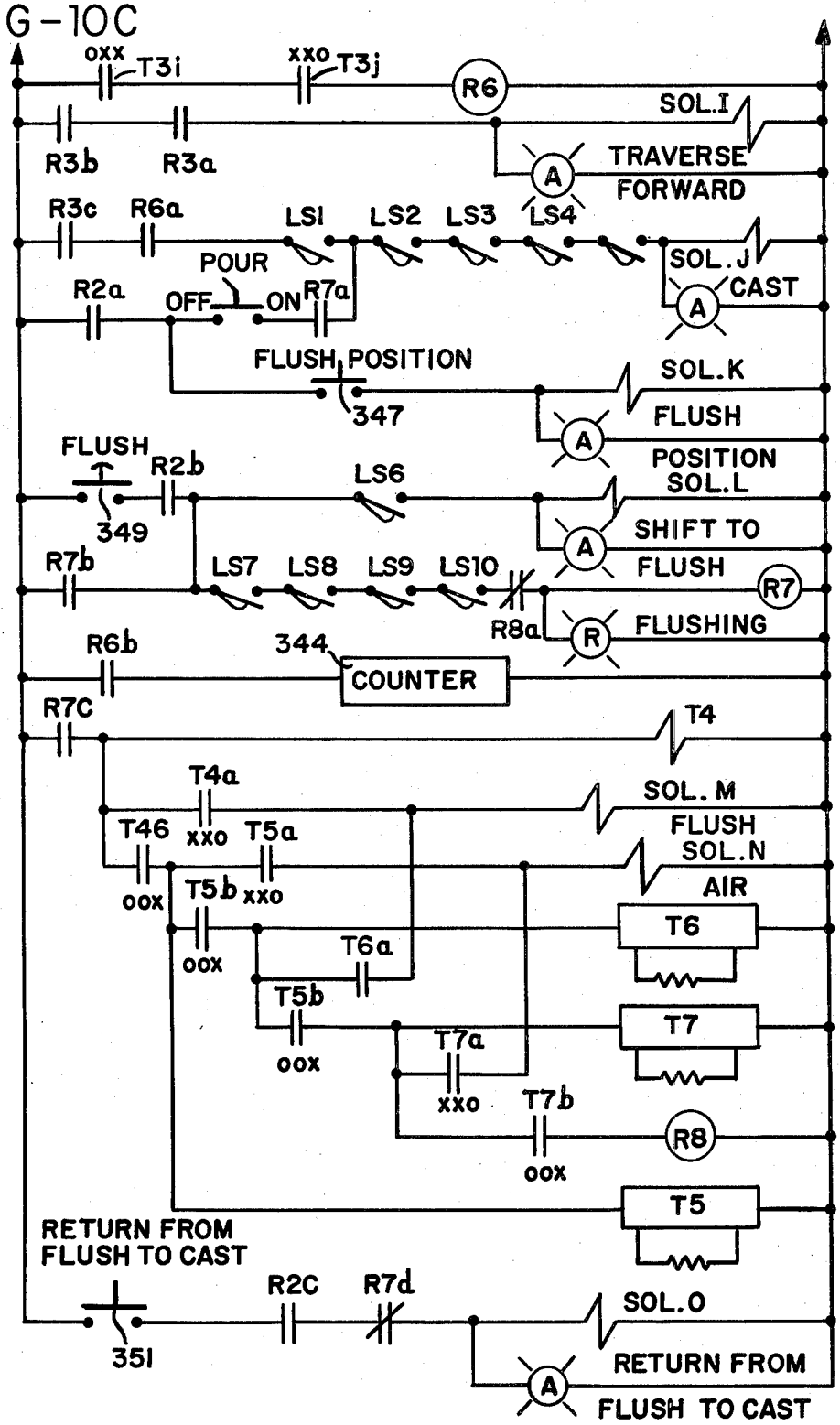

FIGS. 10A, 10B, and 10C illustrate the electrical control circuitry for the present invention in detail when placed together with FIG. 10A positioned above FIG. 10B, and FIG. 10B above FIG. 10C. In FIG. 10 the relay coils are designated with "R" and a number; the corresponding relay coil contacts have the same designation with an additional letter. Similarly, timer coils are given a numbered "T" designation with the timer contacts designated with a corresponding number and an additional letter. Each timer contact has associated therewith a three symbol code consisting of "X's" and "O's." An "X" indicates a closed contact and an "O" indicates an open contact. The first of the three symbols indicates the contact state prior to the timing operation; the second of the three symbols indicates the contact state during timing; and, the third of the three symbols indicates the contact state after timing but prior to reset.

Switch 308 is closed to apply power to transformer 309 via fuses 311. When the POWER switch 313 is momentarily closed, power is supplied through fuse 315 and switch 317 to lines 319 and 321. Light 323 indicates that the power has been turned on. Switch 317 is a safety switch which is closed only when the control panel cabinet is closed.

When START switch 325 is momentarily closed, relay M1 locks itself in through normally open contacts M1d and closes normally open contacts M1a–M1c, resulting in power being applied to motor 255. Motor 255 is mechanically linked to pump 257 (FIG. 9) and powers the hydraulic system. Relay coils R1 are also energized, causing normally open contacts R1a–R1g to be closed.

When switch 327 is closed, solenoid A will be energized, thus actuating valve 289 (FIG. 9B) and causing the conveyor to be powered by motor M6. When switch 329 is closed, solenoid B will be energized, thus actuating valve 291 (FIG. 9B) and causing motor M7 to power the coating rotation mechanism. Similarly, when switch 331 is closed, solenoid C is energized, thus actuating valve 287 and causing motor M5 to power the cure rotation mechanism. Switches 333 through 340 control application of power to solenoids E, F, G, and H, and E-1, F-1, G-1, and H-1, respectively and, in turn, control valves 263–269 (FIG. 9A). Since these valves provide the hydraulic fluid to motors M1–M4, switches 333–340 must be closed for application of liquid plastic to the four zones of a bottle and to reverse the direction of motors M1–M4 during the suck-back cycle.

Mode switch 341 may be set into a manual mode operation, in which case relay coil R2 is energized, or into an automatic mode, in which case relay coil R3 is energized. Assuming that switch 341 is set into the automatic mode, normally opened contact R3a will be closed, thus supplying power to line 343. Sensor 345 senses the presence of a bottle chuck at a desired position on the conveyor. Typically the sensor will energize coils T1 and T1', through contact T1a', as a bottle approaches the coating station. Contact T1b will immediately close, thus energizing the coil of timer T2. Timer T1 controls the movement of the nozzle carriage along the conveyor at the coating station. Timer T2 insures a short delay of approximately 0.2 seconds after the initiation of carriage movement before the coating process is begun. When timer T2 times out, contacts T2a will close, thus energizing relay coil R4. Relay contacts R4a then close energizing timer T3 which controls the duration of the coating operation.

At the end of the coating stage of the operation, timer T3 will time out and contacts T3e, T3f, T3g, and T3h will close, energizing counters C1, C2, C3, and C4, respectively, and initiating the suck-back cycle. Since the amount of coating material applied from each application zone will vary due to differences in coating thicknesses, volume, etc., each zone may require a different amount of time in which the hydraulic motor associated with that zone is driven in a reverse or suck-back direction. To accomplish this, each zone is provided with its own individual digital counter which can be adjusted upwardly or downwardly to control the amount of "suck back" required to eliminate drippage from the applicator nozzles.

Taking Zone 1 as an example and with reference to FIG. 10B, counter C1 is equipped with two coils and arranged so that signals must arrive at both coils and to make it operative. One coil of the counter is continuously fed pulses from an encoder calibrated to send out 240 pulses for every revolution of a pinion gear attached to the drive shaft of hydraulic motor M1. The other coil of counter C1 is activated when contact T3e closes at the end of the coating cycle. Immediately upon activation of counter C1, contacts C1a and C1c close, activating solenoid E-1. As can be seen from FIG. 9A, activation of solenoid E-1 reverses the direction of flow of hydraulic fluid through motor M1 and, thus, reverses its direction of driving pumps P1A and P1B. A slight negative pressure is produced in the Zone 1 coating containing lines which terminates the flow of coating material from the nozzles and sucks back any remaining coating liquid from the nozzle tips. Typically, motor M1 need be driven in the opposite direction for only a small fraction of a revolution to eliminate drippage. Counter C1 may be conveniently adjusted to provide just enough time to eliminate drippage but not enough to cause air to be sucked into the coating lines. The presence of air in the lines adversely affects the quality of later coating cycles because air bubbles will be present on the coated bottles.

After counter C1 has timed out, contacts C1b and C1d will open, deactivating solenoid E-1 and shutting off motor M-1 to complete the suck-back cycle. The suck-back cycle is simultaneously carried out in the same manner for the other coating zones. As with the counter for Zone 1, the counters in the other zones may be individually adjusted to provide the proper amount of suck back to insure elimination of drippage for each zone.

Timer contacts T3c and T3d are connected in series with coil R5 such that R5 will be energized only during the forward traverse operation. Similarly, timer contacts T3i and T3j are connected in series with relay coil R6 such that this relay coil will be energized only during the coating operation. Timer T3 will typically be of a duration such that, even though it is started subsequent to timer T1 by a time equal to the timing cycle of timer T2, timer T3 will complete its timing cycle prior to the completion of that of timer T1.

Since relay R3 will be energized when the mode switch 341 is in the automatic mode, relay contacts R3b will be closed in this mode. When relay coil R5 is energized, the contacts R5a will close, thus energizing solenoid I. As seen in FIG. 9B, this will actuate valve 299 and cause hydraulic cylinder 27 to extend. The rate of such extension is precisely controlled by valve 297 such that the nozzle carriage will move in synchronism with the conveyor.

Contacts R3c will be closed when the device is in the automatic mode and contacts R6a will be closed during the timing cycle of coating timer T3, energizing solenoid J via limit switches LS1, LS2, LS3, LS4, and LS5. Limit switch LS1 is positioned such that it will be closed when the nozzle carriage is positioned over the conveyor (rather than in the flush position). Limit switches LS2-LS5 are associated with valves V1-V4 (FIG. 8) and are closed when those valves are in their A positions. Solenoid J will therefore actuate valve 261 (FIG. 9A), causing motors M1-M4 to be operated and resulting in pumps P1-P4 (FIG. 8) pumping the uncured plastic liquid to their respective nozzle means 231-235.

Referring now to FIG. 10C, when timer T3 times out, coil R6 will be deenergized and thus deenergize solenoid J, terminating the coating operation. Subsequently, timer T1 will time out, deenergizing coil R5 and solenoid I. Valve 299 (FIG. 9B) will be deactivated and the cylinder 27 will retract, moving the nozzle carriage back to its starting position to await initiation of a subsequent coating operation. Contacts R6b will be closed during each coating operation, incrementing counter 344 and providing a running total of the number of coating operations performed.

When it is desired to control manually the application of the plastic liquid by the nozzle means, the mode switch 341 is switched into the MANUAL position, energizing relay R2. Contacts R2a are then closed and solenoid J may be energized by closing the POUR switch 345. The nozzle carriage will remain stationary and plastic liquid will be supplied to the nozzle means as long as switch 345 is closed. The manual mode will typically be used only in setting up the machine, checking its operation, and during the flush operation.

The balance of the electric circuitry controls the flush operation in which solvent and compressed air are forced through portions of the systemic system. When it is desired to flush the system, the mode switch 341 is set into the MANUAL position, energizing relay coil R2 and closing contacts R2a. Flush position switch 347 is then closed, energizing solenoid K, and thus actuating valve 301 (FIG. 9B) to cause hydraulic cylinder 47 to extend. This results in the nozzle carriage 23 being shifted laterally into the flush position at the side of the conveyor. Flush switch 349 is then closed, energizing solenoid L through contacts R2b and limit switch LS6. Limit switch LS6 is closed when the nozzle carriage 23 has been shifted laterally into the flush position. Energizaton of solenoid L results in valve 247 (FIG. 8) being actuated and causes valves V1a-V4a and V1b-V4b to be moved into their respective B positions. When valves V1-V4 are in their flushing positions, limit switches LS7-LS10 will be closed, thus energizing relay R7. Contacts R7a will open, therefore, positively preventing inadvertent actuation of solenoid J by closing switch 345. Contacts R7b will close, locking in relay R7 and maintaining power to solenoid L.

When relay R7 is energized, relay contacts R7c will be closed, thus energiziing timer coil T4. Contacts T4a will immediately supply power to solenoid M which will actuate valve 241 (FIG. 8) and move valves V5a and V5b (FIG. 8) into their B positions. Solvent will now be supplied from tank 237 through valves V1-V4 to the mixers and nozzles. When timer T4 times out, contacts T4a will open, deenergizing solenoid M, and terminating the flush operation. Simultaneously, contacts T4b will close and energize solenoid N through contacts T5a. Solenoid N will actuate valve 253 (FIG. 8) to suply pressurized air to lines 243 and 245. Pressurized air will be forced through the systemic system until timer T5 times out and contacts T5a open to deenergize solenoid N. When this occurs, contacts T5b will close, energizing timer T6 and, at the same time, solenoid M via contacts T6a. Timers T5, T6, and T7 may be of the type having the time period determined by an R-C time constant in which a capacitor is charged through an associated resistor.

The flush operation will thus be repeated for the duration of the timing cycle of timer T6. When timer T6 times out, solenoid M will be deenergized and contacts T6b will close, with the result that timer T7 will be energized. Power will be supplied to solenoid N through contacts T7a, thus resulting in air being supplied to the systemic system for the duration of the timing cycle of timer T7. When timer T7 times out, solenoid N will be deenergized and relay coil R8 will be energized through contacts T7b. R8 will, in turn, open normally closed contacts R8a, thus deenergizing coil R7 and preventing any further flush operation. Contacts R7b will then open, removing power from solenoid L and thus returning valves V1–V4 to their A positions. Contacts R7c will also open, thus precluding operation of solenoids M or N. The flush operation is completed by actuation of switch 351 which, through contacts R2c and R7d, energizes solenoid O. This causes valve 301 (FIG. 9B) to apply hydraulic fluid to cylinder 47 such that the nozzle carriage is returned to its coating position above the conveyor.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. In apparatus for flow coating an article with a layer of plastic including means for moving said article past a coating station, a plurality of liquid applicator nozzle means positioned above said coating station, means for supplying predetermined quantities of uncured liquid plastic material to respective ones of said plurality of nozzle means, and means for moving said plurality of nozzle means parallel to the direction of movement of said article past said coating station, the improvement comprising: said means for supplying uncured liquid plastic material includes means for terminating the flow of uncured liquid coating material by creating a sufficient negative pressure in said plurality of nozzle means to eliminate drippage from said plurality of nozzle means but insufficient to cause air to be sucked into said plurality of nozzle means.

2. The apparatus of claim 1 in which said means for supplying uncured liquid plastic material includes pump means driven by a motor.

3. The apparatus of claim 2 in which said motor is a fluid driven motor.

4. The apparatus of claim 3 including valve means for reversing the direction of fluid flow through said motor.

5. The apparatus of claim 4 including a plurality of pump means driven by a plurality of associated motors and controlled by a plurality of associated valve means, each set of individual pump means and associated motor and valve means supplying uncured liquid plastic material to an associated liquid applicator nozzle means.

6. The apparatus of claim 5 including means to control the activation of said valve means.

7. In a method of flow coating an article with a layer of plastic comprising passing an article to be coated beneath a coating station, metering a predetermined amount of an uncured liquid plastic coating material into a plurality of nozzle means, and flow coating said article with said uncured liquid plastic coating material as it passes beneath said coating station, the improvement comprising: immediately upon termination of the flow of uncured liquid plastic material, creating a sufficient negative pressure in said plurality of nozzle means to draw back into said nozzle means any remaining uncured liquid plastic coating material adhering to said nozzle means but insufficient to cause air to be sucked back into said nozzle means, whereby drippage of said uncured liquid plastic coating material onto the freshly coated article is prevented.

8. The method of claim 7 where the flow of coating material from each nozzle means is independently controlled.

9. The method of claim 8 where the duration and amount of negative pressure applied to each nozzle means is independently controlled.

10. The method of claim 9 where the step of creating a negative pressure in said nozzle means is achieved by operating a pump in the opposite direction from which it is operated to achieve flow of said uncured liquid plastic material from said nozzle means.

11. In apparatus for flow coating an article with a layer of plastic including means for moving said article past a coating station, a plurality of liquid applicator nozzle means positioned above said coating station, means for supplying predetermined quantities of a first component of a liquid plastic material to respective ones of said plurality of nozzle means, means for supplying predetermined quantities of a second component of a liquid plastic material to respective ones of said plurality of nozzle means, means for mixing said first and second components of liquid plastic material immediately prior to said plurality of nozzle means, said first and second components reacting when mixed to form a curable liquid plastic material, and means for moving said plurality of nozzle means parallel to the direction of movement of said article past said coating station, the improvement comprising: each of said means for supplying said first and second components of liquid plastic material includes means for terminating the flow of uncured liquid coating material by creating a negative pressure in said plurality of nozzle means whereby drippage from said plurality of nozzle means is eliminated.

12. The apparatus of claim 11 wherein said means for terminating the flow of uncured liquid coating material includes means for controlling the amount of negative pressure such that air is not sucked into said plurality of nozzle means.

* * * * *